US010648829B2

(12) United States Patent
Mehta et al.

(10) Patent No.: US 10,648,829 B2
(45) Date of Patent: May 12, 2020

(54) SELECTING CONTENT ITEMS USING MAP CONTEXTS BY BACKGROUND APPLICATIONS

(71) Applicant: Microsoft Technology Licensing, LLC, Redmond, WA (US)

(72) Inventors: Kshitij Mehta, Bothell, WA (US); Jeff West, Sammamish, WA (US); David Grochocki, Jr., Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 15/617,958

(22) Filed: Jun. 8, 2017

(65) Prior Publication Data

US 2018/0356243 A1     Dec. 13, 2018

(51) Int. Cl.
*G06F 16/9537* (2019.01)
*G01C 21/36* (2006.01)
(Continued)

(52) U.S. Cl.
CPC ......... *G01C 21/362* (2013.01); *G01C 21/367* (2013.01); *G01C 21/3676* (2013.01);
(Continued)

(58) Field of Classification Search
CPC ................ G01C 21/362; G01C 21/367; G01C 21/3676; G06F 16/9537; G06F 16/29; G06F 3/165; G06T 11/60; G06T 2200/24; G06Q 30/0261; G06Q 30/02; G06Q 30/0241; G06Q 30/0251; G06Q 30/0252; G06Q 30/0265; G06Q 30/0255; H04W 4/02; H04W 4/021; H04W 4/029
(Continued)

(56) References Cited

U.S. PATENT DOCUMENTS

| | | | | |
|---|---|---|---|---|
| 6,321,158 B1 * | 11/2001 | DeLorme | ............... | G01C 21/26 340/995.16 |
| 8,103,445 B2 * | 1/2012 | Smith | .................. | G09B 29/007 340/995.14 |

(Continued)

OTHER PUBLICATIONS

"International Search Report and Written Opinion Issued in PCT Application No. PCT/US2018/033571", dated Aug. 21, 2018, 11 Pages.

(Continued)

*Primary Examiner* — Richard A Goldman
(74) *Attorney, Agent, or Firm* — Holzer Patel Drennan

(57) ABSTRACT

A map application generates a map context that includes information such as the current location and route of a user of a device, and a recent search history. The map context is provided to one or more background applications of the device, which use the map context to determine any content items that may be relevant to the user of the device. The determined content items are provided to the map application, and are presented to the user in the map application. In another implementation, applications running on the device save metadata related to the content items that were provided to the user by the applications. Later, when a user opens the map application, the map application selects content items based on the saved metadata and a map context, and presents the selected content items to the user in the map application.

14 Claims, 11 Drawing Sheets

(51) Int. Cl.
*G06T 11/60* (2006.01)
*G06F 3/16* (2006.01)
*G06F 16/29* (2019.01)

(52) U.S. Cl.
CPC .............. *G06F 3/165* (2013.01); *G06F 16/29* (2019.01); *G06F 16/9537* (2019.01); *G06T 11/60* (2013.01); *G06T 2200/24* (2013.01)

(58) Field of Classification Search
USPC ....... 701/410, 533, 467, 532, 408, 426, 435, 701/468; 455/56.1, 456.3; 705/14.4, 705/14.49, 15.5, 14.53, 14.58, 14.61, 705/14.64
See application file for complete search history.

(56) References Cited

U.S. PATENT DOCUMENTS

| | | | | |
|---|---|---|---|---|
| 8,219,926 | B2* | 7/2012 | Othmer | H04M 1/72572 715/774 |
| 8,737,691 | B2* | 5/2014 | Sivaraman | G06F 16/9537 382/104 |
| 9,549,374 | B2* | 1/2017 | Lim | H04W 52/0258 |
| 9,671,851 | B2* | 6/2017 | Luna | H04W 52/0258 |
| 10,360,593 | B2 | 7/2019 | Hunter | |
| 10,360,760 | B2 | 7/2019 | Northrup | |
| 2002/0035600 | A1* | 3/2002 | Ullman | G06Q 30/0269 709/203 |
| 2003/0069693 | A1* | 4/2003 | Snapp | G01C 21/20 701/469 |
| 2004/0054428 | A1* | 3/2004 | Sheha | G01C 21/3664 700/56 |
| 2005/0049765 | A1* | 3/2005 | Chetia | G01S 5/0027 701/31.4 |
| 2007/0143187 | A1* | 6/2007 | Gottfurcht | G06F 3/04892 705/14.71 |
| 2007/0239348 | A1* | 10/2007 | Cheung | G01C 21/3423 701/467 |
| 2008/0052151 | A1* | 2/2008 | Xie | G06Q 30/02 705/14.54 |
| 2008/0133336 | A1* | 6/2008 | Altman | G06Q 30/0207 455/456.1 |
| 2008/0162037 | A1* | 7/2008 | Hasan Mahmoud | G01C 21/30 701/532 |
| 2008/0228394 | A1* | 9/2008 | Fukuda | G01C 21/26 701/532 |
| 2009/0006194 | A1* | 1/2009 | Sridharan | G06Q 30/02 705/14.62 |
| 2009/0182618 | A1* | 7/2009 | Higgins | G06Q 30/02 705/14.4 |
| 2010/0010958 | A1* | 1/2010 | Perrow | G06Q 30/0261 707/E17.107 |
| 2010/0121567 | A1* | 5/2010 | Mendelson | G01C 21/206 701/467 |
| 2010/0293033 | A1* | 11/2010 | Hall | G06Q 30/02 705/14.53 |
| 2010/0305855 | A1* | 12/2010 | Dutton | H04W 4/18 701/469 |
| 2011/0035284 | A1* | 2/2011 | Moshfeghi | G06Q 30/02 705/14.58 |
| 2011/0082752 | A1* | 4/2011 | Dube | G01C 21/3484 705/14.67 |
| 2012/0088487 | A1* | 4/2012 | Khan | H04W 4/021 455/418 |
| 2013/0046636 | A1* | 2/2013 | Asnake | G06Q 30/0261 705/14.63 |
| 2013/0054363 | A1* | 2/2013 | Sasankan | G06Q 30/0259 705/14.54 |
| 2013/0067035 | A1* | 3/2013 | Amanat | G06Q 30/02 709/219 |
| 2013/0073335 | A1* | 3/2013 | Tang | G06Q 30/02 705/7.29 |
| 2013/0166386 | A1* | 6/2013 | Simmons | G06Q 30/0261 705/14.58 |
| 2013/0226453 | A1* | 8/2013 | Trussel | H04L 51/20 701/533 |
| 2013/0297422 | A1* | 11/2013 | Hunter | G06Q 30/0261 705/14.58 |
| 2013/0339891 | A1* | 12/2013 | Blumenberg | G01C 21/26 715/771 |
| 2014/0006129 | A1* | 1/2014 | Heath | G06Q 30/0222 705/14.23 |
| 2014/0244155 | A1* | 8/2014 | Abe | G01C 21/00 701/410 |
| 2014/0278860 | A1* | 9/2014 | Lee | G06O 30/0214 705/14.16 |
| 2014/0278982 | A1* | 9/2014 | Bayliss-Mcculloch | G06Q 30/0256 705/14.54 |
| 2014/0359537 | A1* | 12/2014 | Jackobson | G06Q 30/0261 715/855 |
| 2015/0038161 | A1* | 2/2015 | Jakobson | H04M 1/72572 455/456.1 |
| 2015/0156061 | A1* | 6/2015 | Saxena | H04W 4/50 715/733 |
| 2015/0178822 | A1* | 6/2015 | Babiarz | G06Q 30/0643 705/26.7 |
| 2015/0237410 | A1* | 8/2015 | Yu | H04N 21/812 725/32 |
| 2015/0241548 | A1* | 8/2015 | Jones | G01S 5/02 455/456.1 |
| 2015/0287072 | A1* | 10/2015 | Golden | G06Q 30/0244 705/14.43 |
| 2016/0037547 | A1* | 2/2016 | Yang | H04W 4/70 370/329 |
| 2016/0188902 | A1* | 6/2016 | Jin | G06F 21/6245 726/28 |
| 2016/0246792 | A1* | 8/2016 | Anguiano | G06F 16/9537 |
| 2016/0270134 | A1* | 9/2016 | Stojanovski | H04W 76/14 |
| 2016/0295358 | A1* | 10/2016 | Cariss | H04W 4/30 |
| 2016/0343032 | A1* | 11/2016 | DeWitt | G06Q 30/0261 |
| 2017/0091823 | A1* | 3/2017 | Adinarayan | G06Q 30/0269 |
| 2017/0192983 | A1* | 7/2017 | Weng | G06F 16/958 |
| 2017/0245127 | A1* | 8/2017 | Pedersen | H04L 12/1845 |
| 2018/0032997 | A1* | 2/2018 | Gordon | G06Q 20/3224 |
| 2018/0063684 | A1* | 3/2018 | Cheng | H04W 4/21 |
| 2018/0097643 | A1* | 4/2018 | Raleigh | H04L 41/0806 |
| 2018/0211282 | A1* | 7/2018 | Gordon | G06Q 30/0261 |
| 2018/0293601 | A1* | 10/2018 | Glazier | G06Q 30/0214 |
| 2019/0050904 | A1* | 2/2019 | Wasserman | G08G 1/093 |
| 2019/0116473 | A1* | 4/2019 | Constantinides | H04W 4/185 |
| 2019/0147426 | A1* | 5/2019 | Kieffer | G06Q 20/204 705/17 |
| 2019/0188956 | A1* | 6/2019 | Higgins | G07F 17/3241 |

OTHER PUBLICATIONS

Empson, Rip, "Looking to Monetize Its Maps, Waze Launches a Location-Aware Mobile Ad Platform for Local Businesses", https://techcrunch.com/2012/11/07/looking-to-monetize-its-maps-waze-launches-a-location-aware-mobile-ad-plafform-for-local-businesses/, Published on: Nov. 7, 2012, 5 pages.

Morrison, Maureen, "Google Expands Mobile Push with Ads in Its Maps App", http://www.adageindia.in/Google-Expands-Mobile-Push-With-Ads-in-Its-Maps-App/articleshow/52424644.cms, Published on: May 24, 2016, 22 pages.

* cited by examiner

SELECTING CONTENT ITEMS USING MAP CONTEXTS BY BACKGROUND APPLICATIONS

BACKGROUND

Map applications are a popular type of application with a variety of uses. For example, a user may use a map application to determine directions, or may use a map application to determine restaurants, banks, drugstores, and other entities near a current location. Map applications are commonly integrated into smartphones, tablets, and vehicle navigation systems, and may be accessed by any computing device though the Internet.

Many applications periodically present content items such as images, videos, and sound recording to users of the applications. These content items may include advertisements, for example. These content items are often presented in exchange for free, or reduced cost use of the application, or because the user has shown an interest in a product or service that is associated with the application. For example, an application such as a music streaming application may periodically play an audio content item that is an advertisement for a local restaurant, or an application that is associated with a department store may periodically present the user with content items that include coupons or descriptions of new products available at the store.

Modern devices such as smartphones execute multiple applications simultaneously, with each application presenting content items to the user. However, current applications are not able to share information about content items, or provide content items for other applications to present. This problem is particularly evident with map applications that may have location and search information that may be useful for other applications to use in selecting a content item to present. Continuing the examples above, for the music streaming application, the application could play the content item for the restaurant when the location information associated with the map application indicates that the user is at a location that is near the restaurant. Similarly, the department store application could provide a content item to the map application that is a coupon for the department store when the user searches for a store in the map application. The map application could present the coupon to the user along with the search results.

SUMMARY

A map application is provided that generates a map context that includes information such as the current location and route of a user of a device, as well as a recent search history. The map context is provided to one or more background applications of the device, which use the map context to determine any content items that may be relevant to the user of the device. The determined content items are provided to the map application, and are presented to the user in the map application. In another implementation, applications running on the device save metadata related to the content items that were provided to the user by the applications. Later, when a user opens the map application, the map application selects content items based on the saved metadata and a map context, and presents the selected content items to the user in the map application.

In an implementation, a system for selecting content items based on map contexts by background applications and for rendering the selected content items on a map is provided. The system includes at least one computing device and a map engine executed on the at least one computing device. The map engine is adapted to: generate a map context, wherein the map context comprises a current location of the at least one computing device; provide the generated map context to one or more of a plurality of applications; in response to the provided map context, receive one or more content items from one or more applications of the plurality of applications, wherein each content item is associated with a location and each content item was selected by an application of the plurality of applications based on the map context; render a map on a display associated with the at least one computing device; and render the received one or more content items on the rendered map based on the locations associated with the received one or more content items and the location of the at least one computing device.

In an implementation, a system for selecting content items to render on a computing device using a map context and metadata generated by a plurality of background applications is provided. The system includes at least one computing device and a map engine executed on the at least one computing device. The map engine is adapted to: render a map on a display associated with the at least one computing device; receive metadata generated by a plurality of applications, wherein the metadata is associated with one or more content items presented by the applications of the plurality of applications; generate a map context, wherein the map context comprises a current location of the at least on computing device; select a content item based on the map context and the received metadata, wherein the content item is associated with a location; and render the selected content item on the rendered map based on the location associated with the content item and the location of the at least one computing device.

In an implementation, a method for selecting content items based on map contexts by background applications is provided. The method may include: executing a background application by a computing device; generating a map context by the computing device, wherein the map context comprises a current location of the computing device; providing the generated map context to the background application by the computing device; in response to the generated map context, receiving a first content item from the background application, wherein the first content item is associated with a location and the first content item was selected by the background application based on the map context; rendering a map on a display associated with the computing device by the computing device; and rendering the received first content item on the rendered map based on the location associated with the first content item and the location of the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
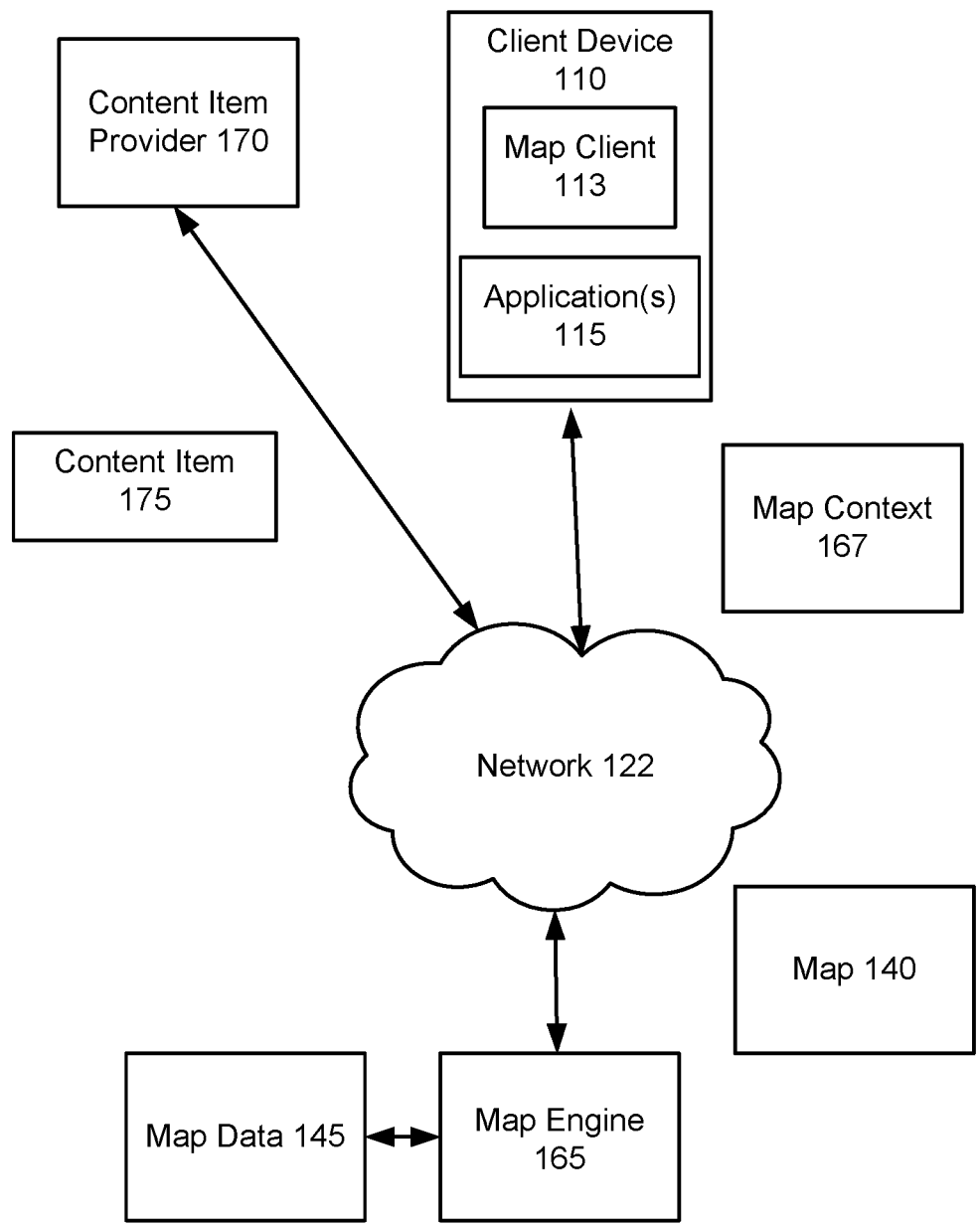
FIG. 1 is an illustration of an exemplary environment for providing content items received from background applications in a map application.

FIG. 1 is an illustration of an exemplary environment 100 for providing content items received from background applications in a map application. The environment 100 may include a map engine 165, a content item provider 170, and one or more client devices 110 in communication through a network 122. The network 122 may be a variety of network types including the public switched telephone network (PSTN), a cellular telephone network, and a packet switched network (e.g., the Internet). Although only one client device 110, one map engine 165, and one content item provider 170 are shown in FIG. 1, there is no limit to the number of client devices 110, map engines 165, and content item providers 170 that may be supported.

Figure 11:
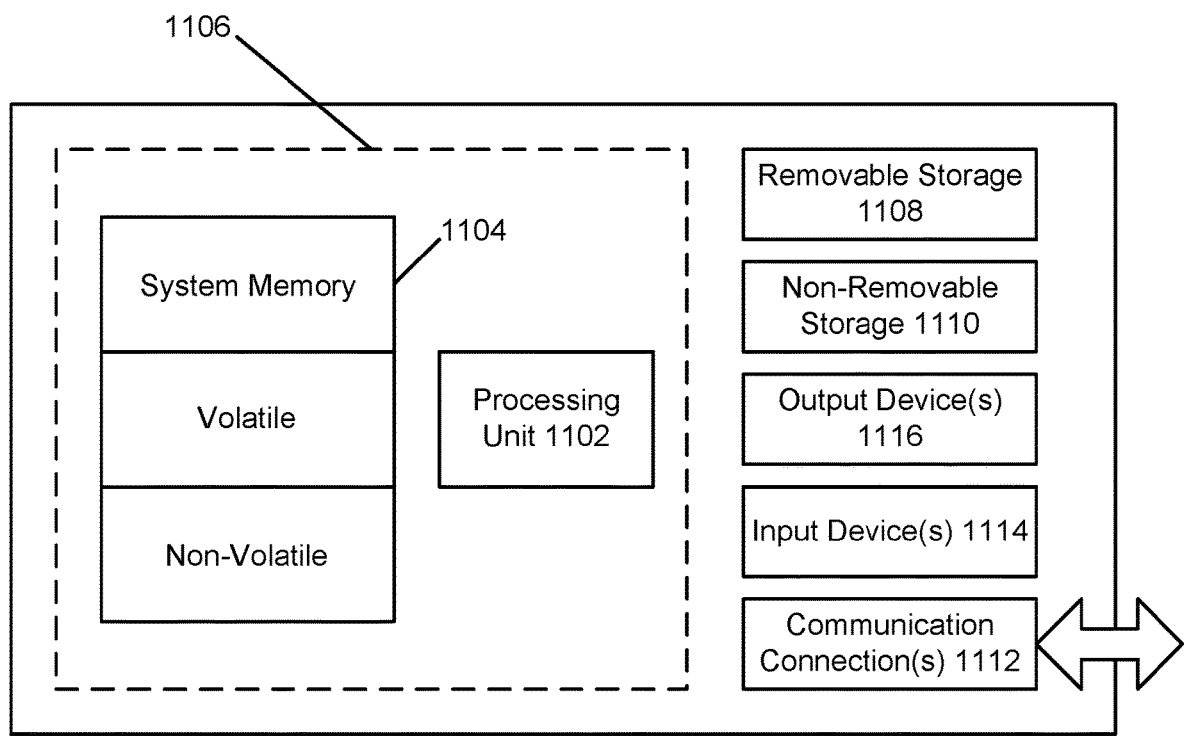
FIG. 11 shows an exemplary computing environment in which example embodiments and aspects may be implemented.

The client device 110, the map engine 165, and the content item provider 170 may be implemented using a variety of computing devices such as smartphones, desktop computers, laptop computers, tablets, vehicle navigation systems, and video game consoles. Other types of computing devices may be supported. A suitable computing device is illustrated in FIG. 11 as the computing device 1100.

Each client device 110 may further include a map client 113. The map client 113 may be used by a user of the client device 110 to view and interact with one or more maps 140. Depending on the implementation, the map client 113 and the map engine 165 may be, or may be part of, a map application. An example map application is the map application integrated into many smartphones, tablet computers, and vehicle navigation systems.

Each map 140 may include map data 145. The map data 145 may include the various features of the map 140 such as roads, buildings, bodies of water, parks, landmarks, etc. The map data 145 may also include locations and other information about entities such as hotels, restaurants, bars, stores, universities, hospitals, etc. The map data 145 may further include information such as traffic data (real-time and historical). The map data 145 may further include information about public transportation, trains, ferries, bike trails, and other modes of transportation. Other information may be included in the map data 145.

The map engine 165 may use the map data 145 to generate recommendations in response to queries received from users associated with the map client 113. The queries may include queries for a route between an origin location and a destination location. The map engine 165 may use the map data 145 to determine a route between the origin location and the destination location.

Other examples of queries may include queries for nearby restaurants, stores, or attractions. For example, a user may provide a query such as "pizza" to the map engine 165 through the map client 113. In response, the map engine 165 may locate restaurants that sell pizza near the current location of the user, and the map client 113 may render or display the located restaurants on the map 140.

In addition to the map client 113, the client device 110 may execute one or more applications 115. The applications 115 may include any type of application that may be executed by a computing device such as a smartphone, tablet computer, or laptop. Example applications 115 may include social networking applications, telephone or messaging applications, and music streaming applications. The applications 115 may further include store, business, or brand specific applications 115. For example, businesses such as departments stores, restaurants, and hotel chains may each provide an application 115 that provides information such as offers and discounts to users of the application 115.

Typically, users of client devices 110 interact with a variety of applications 115 throughout the day. The application 115 that a user is currently using may be referred to as the foreground or active application 115. The applications 115 that the user is not currently using may be referred to as background or inactive applications 115. While the background applications 115 are not being interacted with by the user, they may still consume some processing resources of the client device 110 and may be able to provide notifications or other messages to the user. Moreover, some background applications 115 may have access to sensors or other components of the client device 110 while they are inactive. For example, a background application 115 such as a music streaming application may continuously use network resources of the client device 110 to download music and output the downloaded music on speakers associated with (e.g., paired or plugged into) the client device 110 while the user interacts with a foreground application such as the map client 113.

The applications 115 (including the map client 113) may provide one or more content items 175. A content item 175 may include audio content items (e.g., songs, tracks, and recordings), video content items (e.g., videos), and image content items (e.g., pictures, images, and text). Other types of content items 175 may be supported.

In some implementations, the content items 175 may be advertisements that are provided to the user of an application 115. How a content item 175 is provided may depend on the type of content item 175 and may include displaying or playing on a display associated with the client device 110, or playing through a speaker associated with the client device. For example, an application 115 such as a music streaming application may periodically play audio content item advertisements through the speakers that are associated with the client device 110. In another example, a video streaming application may periodically display a video content advertisement before a new video is played on the client device 115. In another example, a videogame application may designate a region of the display to present image content item 175 advertisements (e.g., banner advertisements) while the user plays the videogame.

The applications 115 may receive content items 175 from one or more content item providers 170. The content item provider 170 may be a service (e.g., an advertisement service or syndicator) that provides content items 175 for applications 115 to provide. The content items 175 that are provided to an application 115 may depend on a variety of factors such as the type of application 115, and demographics or profile information about the user associated with the client device 110.

As described above, one drawback associated with background applications 115 is that there is no way for the background applications 115 to receive information from the map client 113 that could be used by the background application 115 to select content items 175, or for the background applications 115 to provide or surface content items 175 to the map client 113 for presentation by the map client 113.

For example, when a user is using the map client 113, a music streaming application 115 may be executing in the background and may be playing music through the speakers associated with the client device 110. When the music streaming application 115 selects an audio content item 175 to play, it would be useful for the music streaming application 115 to know the current location of the client device 110 as well as the route that the user is traveling. If the information was known, the music streaming application 115 could play an audio content item 175 that is an advertisement for a restaurant that is along the route that the user is traveling, or that is near the current location of the user. In addition, the music streaming application 115 could provide a content item 175 advertisement for the restaurant for the map client 113 to display on the map 140 while the related audio content item 175 advertisement is played.

To allow for better integration with respect to content items 175 for applications 115 and map clients 113, the map engine 165 and/or map client 113 may generate what is referred to herein as a map context 167. As described further below, the map context 167 may include information about the current usage of the map client 113 such as the current location of the client device 110, and a route that the client device 110 is currently traveling in the map client 113.

The map context 167 may be provided to the applications 115, and the applications 115 may use the map context 167 to select content items 175 that may be relevant to the map context 167. The applications 115 may provide the selected content items 175 to the map client 113, and the map client 113 may present some or all of the selected content items 175 to the user.

Continuing the example above, the music streaming application 115 could determine from the map context 167 that the user will pass a restaurant on a current route. In response, the music streaming application 115 may select a content item 175 associated with the restaurant such as icons or logos associated with the restaurant or a coupon associated with the restaurant, and may provide the selected content items 175 to the map client 113. The map client 113 may render or display the icons or logos associated with the restaurant on the map 140 along with the coupon. In addition, the music streaming application 115 running in the background may play an audio content item 175 that refers to the content items 175 rendered or displayed by the map client 113.

Figure 2:
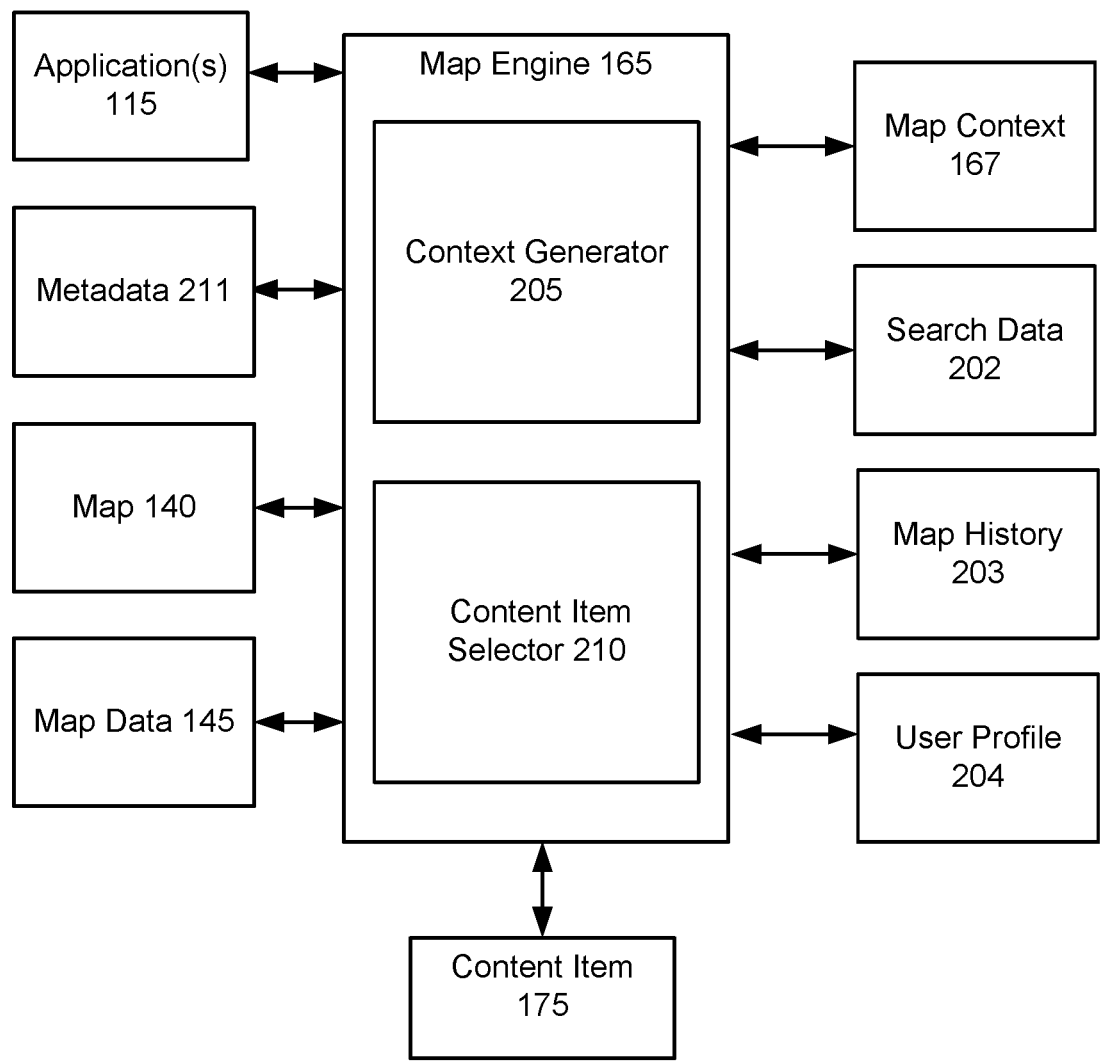
FIG. 2 is an illustration of an implementation of an exemplary map engine.

FIG. 2 is an illustration of an implementation of an exemplary map engine 165. The map engine 165 may include one or more components including a context generator 205 and a content item selector 210. More or fewer components may be included in the map engine 165. Some or all of the components of the map engine 165 may be implemented by one or more computing devices such as the computing device 1100 described with respect to FIG. 11. In addition, some or all of the functionality attributed to the map engine 165 may be performed by the map client 113, and vice versa. Moreover, some or all of the functionality of the map engine 165 and/or the map client 133 may be performed by a cloud computing platform.

The context generator 205 may generate a map context 167 for the map client 113. Depending on the implementation, the map context 167 may include a current location of the client device 110, and an indication of a current route that the client device 110 is traveling. The current route may include an origin location and a destination location and an estimated time of arrival for the client device 110 at the destination location. Other information may be included in the map context 167 such as a current time and/or date, or indications of the applications 115 that are currently executing on the client device 110.

The map context 167 may further include search data 202 associated with the user of the client device 110. The search data 202 may include queries or requests that have been received by the map client 113 and/or map engine 165 from the user. The search data 202 may include the types of restaurants, businesses, landmarks, or addresses that the user has previously searched for, and may include the times, dates, and locations associated with the searches. Depending on the implementation, the context generator 205 may include all of the search data 202 in the map context 167, or may only include recent search data 202 in the map context 167.

The map context 167 may further include what is referred to herein as map history 203. The map history 203 may include the various locations and/or routes that were associated with the user and/or client device 110 in the past. The map history 203 may also include indicators of the various businesses that the user has traveled to such as restaurants and stores. Depending on the implementation, the context generator 205 may include all of the map history 203 in the map context 167, or may only include recent map history 203 in the map context 167.

The map context 167 may further include a user profile 204. The user profile 204 may include information about the user of the client device 110 that may not be specific to the map client 113, but that may be relevant in selecting a content item 175. For example, the user profile 204 may include information provided by the user such as interests, likes, or dislikes. The information may be explicitly provided by the user, or may be inferred from user behavior. Depending on the implementation, the user profile 204 may include information collected by one or more social networking applications.

As may be appreciated, the information included in the map context 167 may be personal and private. Accordingly, to protect the privacy of the user, all of the map context 167 (and the information used to create the map context 167) may be encrypted. Moreover, before any data associated with any of the map context 167, search data 202, map history 203, and/or user profile 204 is collected, generated, or used by the context generator 205 (or any other component of the map engine 165), the user may be asked to opt-in or otherwise consent to the use and collection of such data.

The context generator 205 may provide the generated map context 167 to one or more background applications 115 executing on the client device 110. Each background application 115 may determine one or more content items 175 that are relevant to the map context 167 that was provided by the context generator 205. For example, if the map context 167 shows that the user recently searched for "restaurant" or "take-out" in the map client 113, then the background applications 115 may select a content item 175 that is associated with a restaurant that is located close to the current location of the client device 110 or that is located along the route currently being traveled by the client device 110.

Depending on the implementation, rather than provide the map context 167 to the background applications 115, the map engine 165 may provide the map context 167 to the content item provider 170. The content item provider 170 may consider the map context 167 when selecting content items 175 for the applications 115. The applications 115 may provide the content items 175 that are selected to the map engine 165 and/or map client 113.

Some of the content items 175 may be associated with locations. As may be appreciated, many of the content items 175 may be advertisements for stores or businesses that have locations on the map 140. Accordingly, each content item 175 may similarly be associated with a location that corresponds to the associated store or business. The locations associated with each content item 175 may be used to render the content items 175 on the map 140, or to otherwise indicate the location of the associated business or store on the map 140.

As may be appreciated, in some implementations, the map client 113 may not be running or active on the client device 110 when the background applications 115 generate content items 175. For example, a user associated with the client device 110 may have closed the map client 113, the GPS or other location determination component of the client device 110 used by the map client 113 may be inactive, or the user may be using a client device 110 that does not include a map client 113 or that is not used by the user for navigation.

In such implementations, the map engine 165 may further include a content item selector 210. The content item selector 210 may select content items 175 for the map client 113 based on one or more content items 175 that were presented by one or more of the applications 115 to the user in the past. For example, a background application 115 may have presented a content item 175 that is a commercial for an amusement park to the user.

Later, when the user opens the map client 113, the content item selector 210 may recognize that the commercial for the amusement park was previously presented to the user, and may select and present another content item 175 that is also related to the amusement park. For example, the content item selector 210 may select an icon or graphic that is representative of the amusement park, and may render the icon or graphic on the map 140 at the location associated with the amusement park. Additionally, a content item 175 that encourages the user to travel to the location of the amusement park may be presented to the user.

In some implementations, the content item selector 210 may select content items 175 to present in the map client 113 using what is referred to herein as metadata 211. The metadata 211 may comprise information about the content items 175 that were previously presented by the applications 115 when the map client 113 was not active, or that were previously presented on a different client device 110 that did not include a map client 113. The metadata 211 may indicate the content item 175 that was provided along with other information such as the time that the content item 175 was provided, the application 115 that provided the content item 175, and the business, entity, or product that is associated with the content item 175. Other information may be included in the metadata 211.

In addition, the metadata 211 may also indicate whether or not the user interacted with each content item 175 when it was presented by the application 115. For example, if a user interacted with a content item 175 such as an advertisement for a book store by clicking or selecting the content item 175 when it was presented by the application 115, it may indicate that the user is interested in the product or service associated with the content item 175. Accordingly, it may be desirable for the map client 113 to present content items 175 for the same or related product or service.

The applications 115 may provide metadata 211 for each of the content items 175 that they presented to the user associated with the client device 113. In some implementations, the metadata 211 may be provided directly to the map engine 165 and/or map client 113, or may be stored at a location of the client device 110 where it can be retrieved by the content item selector 210. Alternatively or additionally, the metadata 211 can be provided to the content item provider 170, where it may be requested by the content item selector 210, or may be used by the content item provider 170 to select and provide content items 175 for the map engine 165 and/or map client 113.

The content item selector 210 may select one or more content items 175 for the map client 113 using the metadata 211 and the map context 167. In some implementations, the content item selector 210 may determine content items 175 that are, or that are related to content items 175 that were presented by one or more applications 115 based on the metadata 211. The content item selector 210 may determine which of the content items 175 are most relevant to the map context 167. Some or all of the relevant content items 175 may be presented to the user on the map 140. Depending on the implementation, the content items 175 may be presented by rendering or displaying each content item 175 at the location associated with the content item 175 on the map 140.

To determine the relevant content items 175 based on the map context 167, the content item selector 210 may determine content items 175 with locations that are near the location of the map client 113, or with locations that are near the route being followed by the map client 113. Other information from the map context 167 may be considered such as the map history 203 or search data 202 associated with the user or map client 113.

For determining content items 175 based on the route being followed by the map client 113, the content item selector 210 may use the route to predict where the user is likely to be in the future. The content item selector 210 may determine content items 175 with locations that are near the predicted future location and that are likely to be relevant to the user based on the time that the user is expected to arrive at the future location and the current time.

For example, the current time may be 11 am, and the route being followed by the user is estimated to arrive at a predicted location around 12 pm (e.g., lunch time). Accordingly, the content item selector 210 may determine content items 175 that are associated with restaurants that are near the predicted location. As another example, the user may be on a long trip and the content item selector 210 may use the current route being followed by the user and the current time to predict where the user is likely to want to stop to rest for the night. The content item selector 210 may determine content items 175 for hotels that are near the predicted location. When the user is likely to want to eat or rest may be based on historical information associated with the user (or other users) such as when the user typically eats meals and when the user typically goes to bed, for example.

Figure 3:
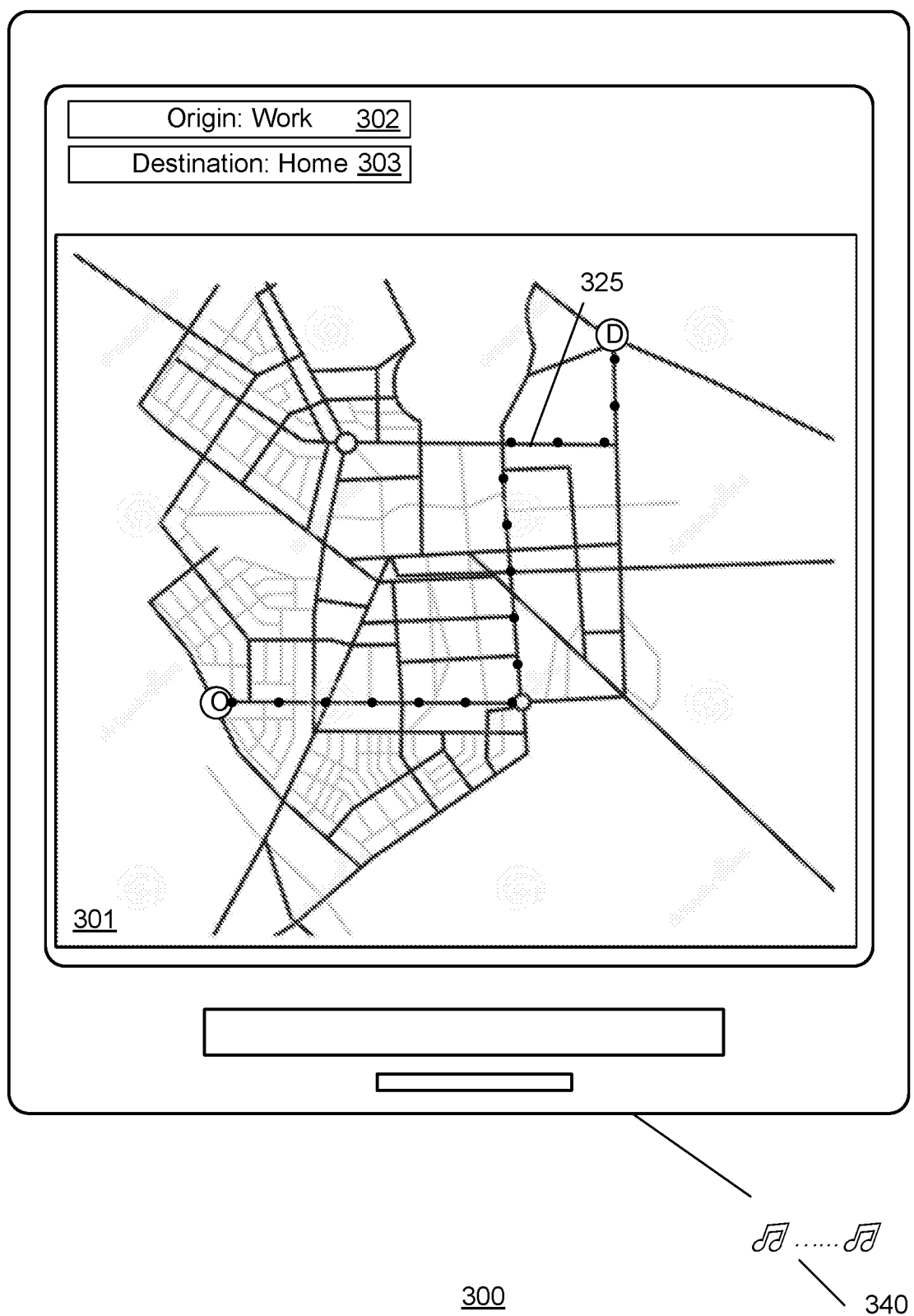
FIGS. 3-7 are illustrations of example user interfaces for providing content items.

FIG. 3 is an illustration of an example user interface 300 for presenting one or more content items 175 provided by background applications 115 in a map client 113 based on a map context 167. The user interface 300 may be implemented by a map client 113 and/or a map engine 165 executing on a client device 110. As shown, the user interface 300 is displayed on a tablet computing device. However, the user interface 300 may also be displayed by other computing devices, such as smartphones and desktop or laptop computers.

In a window 301, a map 140 is displayed to the user. The map 140 includes a route 325 illustrated as a dotted line. The route 325 is a route between an origin location labeled "O" and a destination location labeled "D". The origin location may have been entered by the user into the user interface element 302, and the destination location may have been entered by the user into the user interface element 303.

In the example shown, the user may be using the map client 113 to follow the route 325 between the user's work and the user's home. While the user is traveling on the route 325, one or more applications 115 may be operating in the background. In particular, the user may be listening to an audio content item 340 (e.g., music) provided by a music streaming application 115. The audio content item 340 may be output or played by speakers associated with the client device 110.

Figure 4:
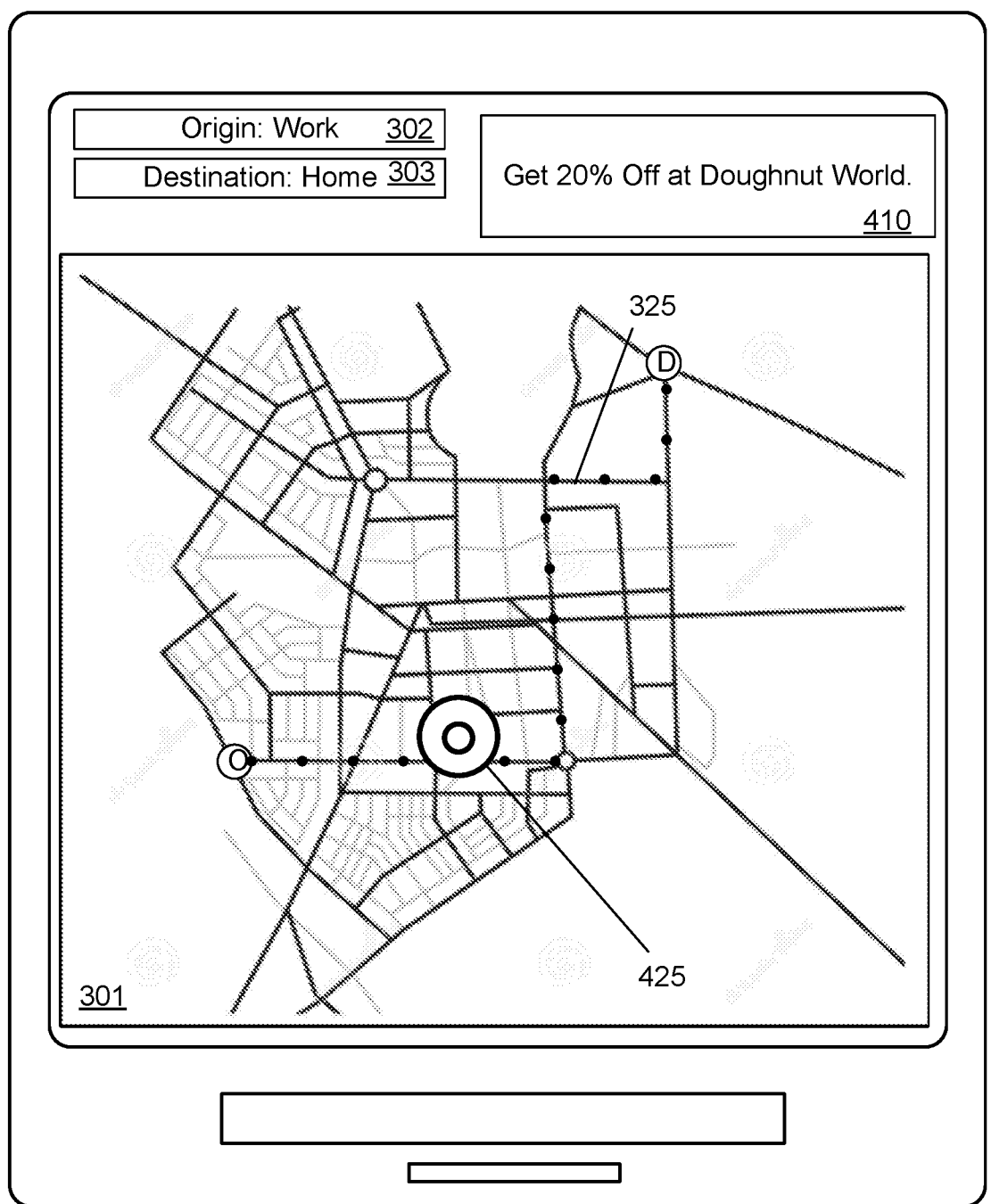

Continuing to FIG. 4, the context generator 205 has generated a map context 167 for the user. The generated map context 167 may include information such as the route 325, the current location of the user or client device 110, and other information such as the map history 203 and the user profile 204. The context generator 205 may have provided the generated map context 167 to the music streaming application 115 running in the background of the client device 110. Alternatively or additionally, the context generator 205 may have provided the map context 167 to the content item provider 170.

In response, the music streaming application 115 has selected a plurality of content items 175 based on the map context 167, and has provided the content items 175 to the map client 113. The map client 113 has presented (e.g., displayed) the provided content items 175 in the user interface 300.

One provided content item 175 is a user interface element 410 that informs the user that they may "Get 20% Off at Doughnut World." In addition, another provided content item 175 is the icon 425 in the shape of a doughnut. The icon 425 may be rendered on the map 140 at the location associated with the content item 175. The user may select the icon 425 to re-route the map client 113 to the associated location.

In addition, at some point in time, the music streaming application 115 running in the background of the client device 110 has provided (e.g., played) an audio content item 440 that is a commercial for doughnut world. The audio content item 440 may be provided by the music streamlining application 115 at approximately the same time that the icon 425 and the user interface element 410 are presented in the user interface 300 by the map client 113.

Figure 5:
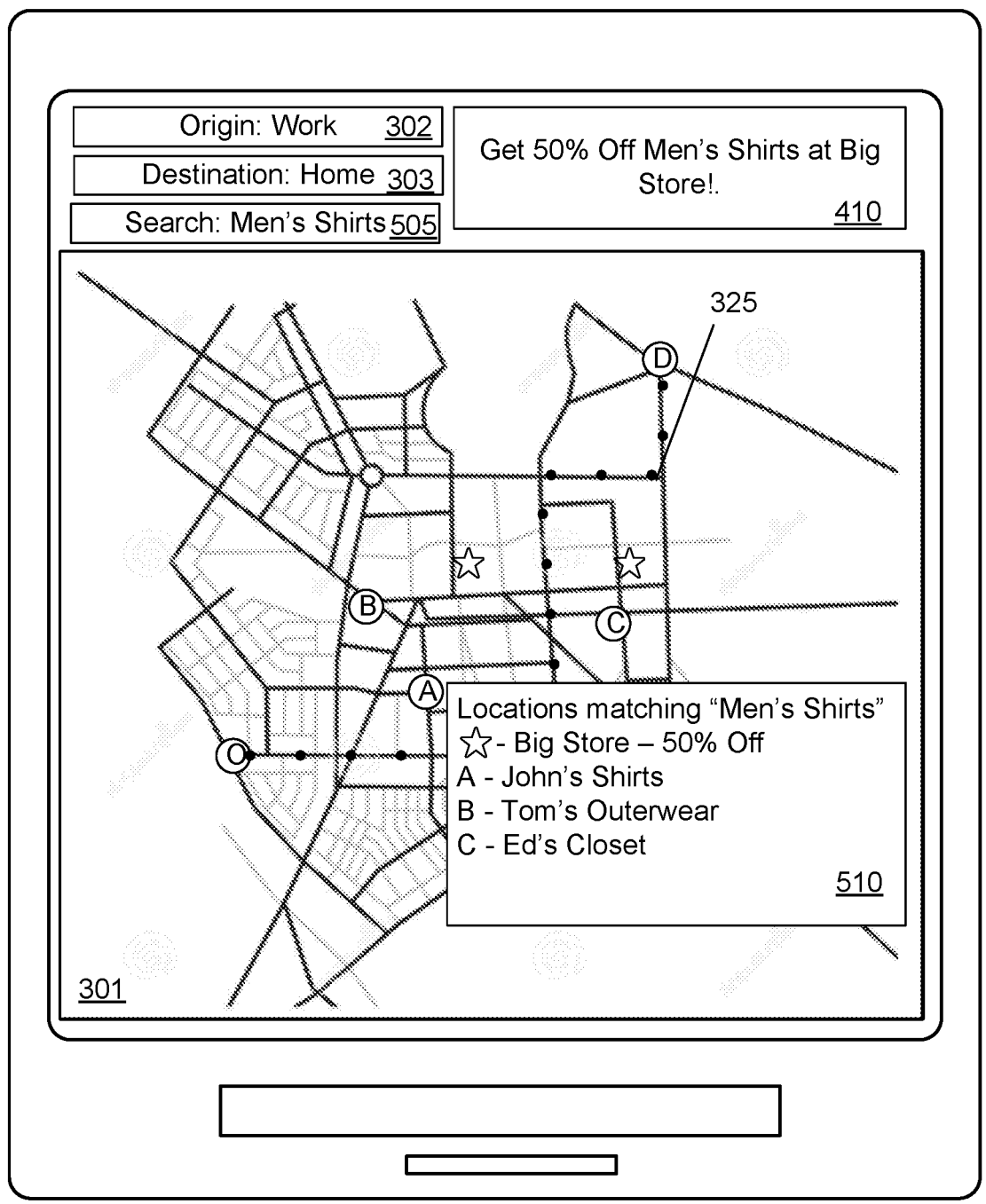

Continuing to FIG. 5, as another example, while traveling the route 325, the user may determine that he would like to buy a shirt and has entered the query "Men's Shirts" into a user interface element 505. In response, the map client 113 may have provided the query to the map engine 165 which may use the map data 145 to determine one or more locations that match the query. The locations that match the query are shown in a results window 510 and icons A, B, and C have been rendered on the map 140 at the associated locations.

In addition, the context generator 205 may include the query "Men's Shirts" into the map context 167, and may provide the map context 167 to one or more applications 115 running in the background of the map client 113. In the example shown, one of the applications 115 may be an application 115 for the store "Big Store".

When the application 115 associated with "Big Store" receives the map context 167, it may determine multiple content items 175 that are relevant to the map context 167 and may provide the content items 175 to the map client 113. One provided content item 175 is the user interface element 410 that informs the user that they may "Get 50% Off Men's Shirts at Big Store!" Other provided content items 175 are the star shaped icons that have been rendered at their associated locations on the map 140. In addition, the results window 510 has been updated to include the content items 175 for the "Big Store".

Figure 6:
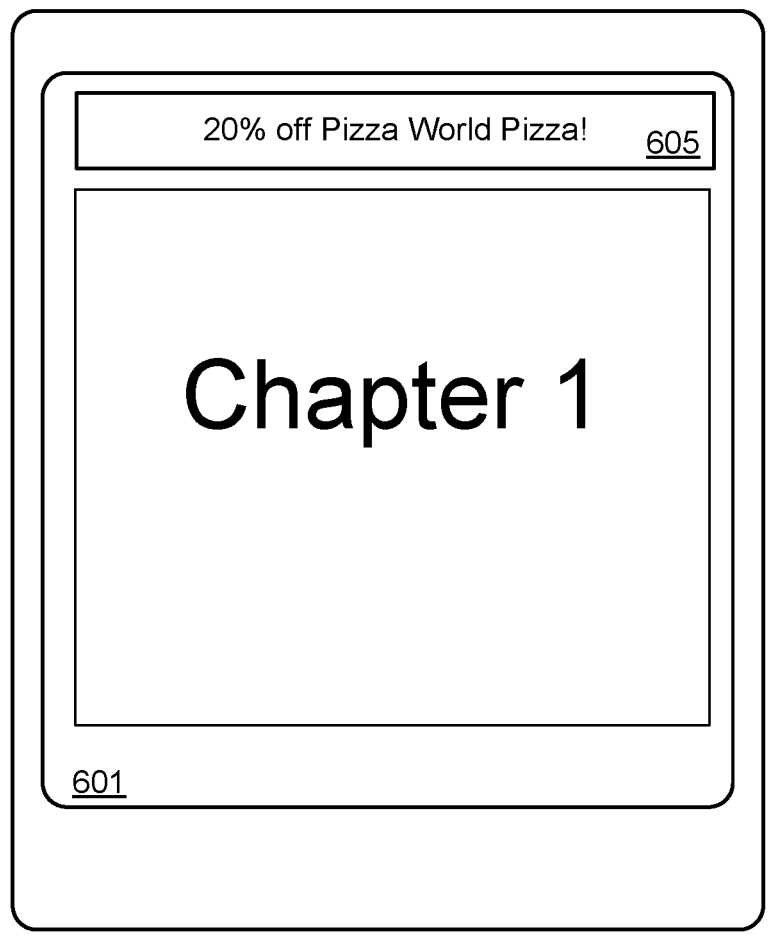

Continuing to FIG. 6 is an illustration of a user interface 600. The user interface 600 may be associated with an application 115 such as an e-reader. The user interface 600 may be implemented on a different client device 110 than the user interface 300.

As shown, the user interface 600 includes a window 601 that is displaying an e-book that the user is reading. The user interface 600 also includes a window 605 where a content item 175 is being displayed to the user by the application 115. In the example shown, the content item 175 is an advertisement for "Pizza World Pizza."

While the user is using the e-reader, the application 115 may write metadata 211 for each of the content items 175 that are presented by the application 115. In the example shown, the application 115 may write metadata 211 corresponding to the "Pizza World" content item 175 shown in FIG. 6.

Figure 7:
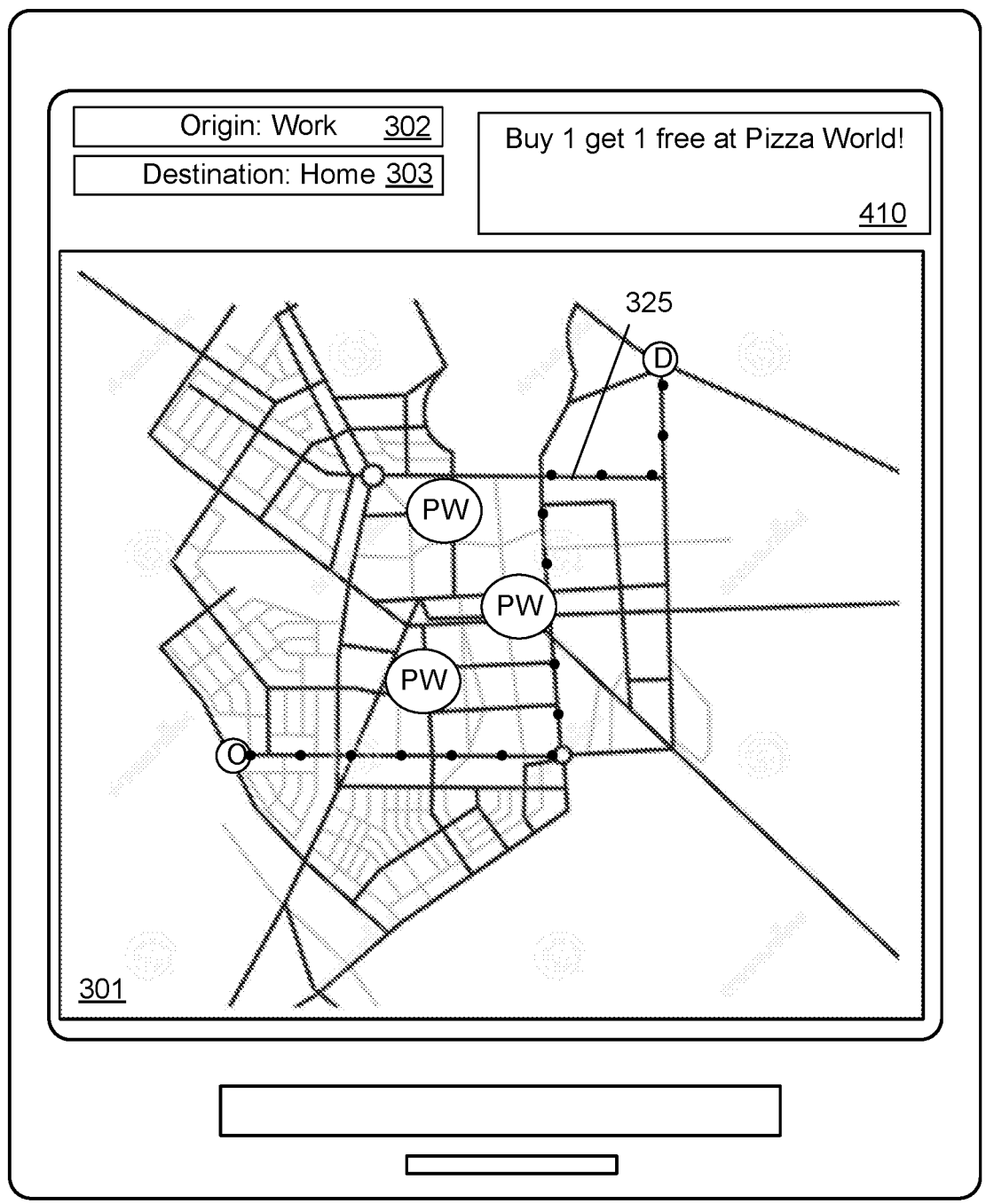

Continuing to FIG. 7, at some point in time, the user has stopped using the client device 110 associated with the user interface 600 and has returned to the client device 110 associated with the map client 113 and the user interface 300. After the map client 113 is loaded by the client device 110, the content item selector 210 may retrieve the metadata 211 written by the application 115, and may select one or more content items 175 to present in the map client 113

In the example shown, the metadata 211 may indicate that the user was presented the "Pizza World" content item 175 through the user interface 600. Accordingly, the content item selector 210 has selected and presented content items 175 that correspond or are related to the "Pizza World" content item 175. One presented content item 175 is the user interface element 410 that informs the user that they may "Buy 1 get 1 free at Pizza World!" Other content items 175 are the icons labeled "PW" (i.e., Pizza World) that have been rendered at their associated locations on the map 140.

Figure 8:
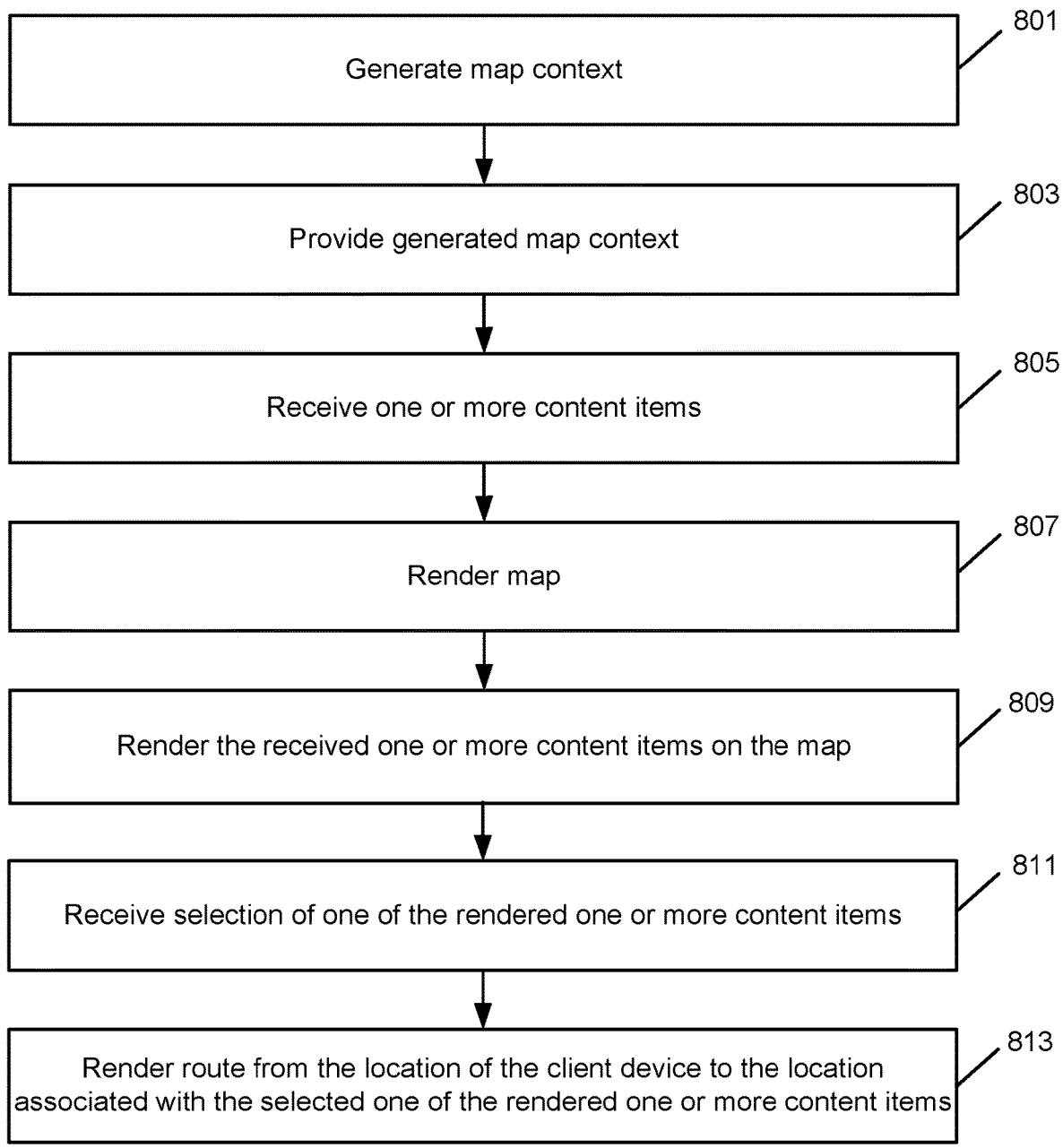
FIG. 8 is an operational flow of an implementation of a method for receiving content items generated by background applications and for rendering the content items in a map application running in the foreground.

FIG. 8 is an operational flow of an implementation of a method 800 for receiving content items 175 generated by background applications 115 and for rendering the content items in a map application 115 running in the foreground. The method 800 may be implemented by the map engine 165 and/or the map client 113.

At 801, a map context is generated. The map context 167 may be generated by the context generator 205 of the map engine 165. The map context 167 may be for a map application executing in the foreground of a client device 110 such as a smartphone, tablet computer, or vehicle navigation system. The map context 167 may include information such as a current location of a user or of the client device 110, a list of the background applications 115 running on the client device 110, a current route being traveled by the user or of the client device 110, a search history of the user (i.e., search data 202), a route or location history of the user or client device 110 (i.e., map history 203), and demographics or other information about the user of the client device 110 (i.e., user profile 204). Other information may be included in the map context 167 such as a current speed of the user or client device 110, the time of day, and traffic conditions, for example.

At 803, the generated map context is provided. The generated map context 167 may be provided to one or more background applications 115 executing on the client device 110. Alternatively or additionally, the map context 167 may be provided to one or more content item providers 170.

At 805, one or more content items are received. The one or more content items 175 may be received by the map engine 165 from one or more background applications 115. The background applications 115 may have selected the content items 175 using the map context 167. Alternatively or additionally, the content items 175 may have been selected by the content item provider 170. The one or more content items 175 may include audio content items, video content items, and advertisements, for example. Depending on the implementation, each of the received one or more content items 175 may be associated with a location.

At 807, a map is rendered. The map 140 may be rendered or presented by the map client 113 and/or the map engine 165 on a display associated with the client device 110. The map 140 may include a plurality of locations including a current location of the client device 110 and a current route being followed by the client device 110 between an origin location and a destination location.

At 809, the received one or more content items are rendered on the map. The received one or more content items 175 may be rendered or presented on the display associated with the client device 110 on top of the rendered map 140 by the map client 113 and/or the map engine 165. Where the content items 175 have associated locations, the content items 175 may be rendered on the map 140 at the associated locations. In addition, some of the content items 175 may be rendered at a portion of the map 140 reserved for advertisements or sponsored content items.

At 811, a selection of one of the rendered content items 175 is received. The selection may be received by the map client 113 and/or the map engine 165. Depending on the implementation, the user may provide the selection by touching or interacting with the rendered content items 175 on the display of the client device 110. Alternatively, a mouse or other user interface device or input device may be used.

At 813, a route from the location of the client device 110 to the location associated with the selected one of the rendered content items 175 is rendered on the map. The route may be rendered on the map 140 by the map client 113 and/or the map engine 165. The route may be determined by the map client 113 and/or the map engine 165 using the map data 145.

Figure 9:
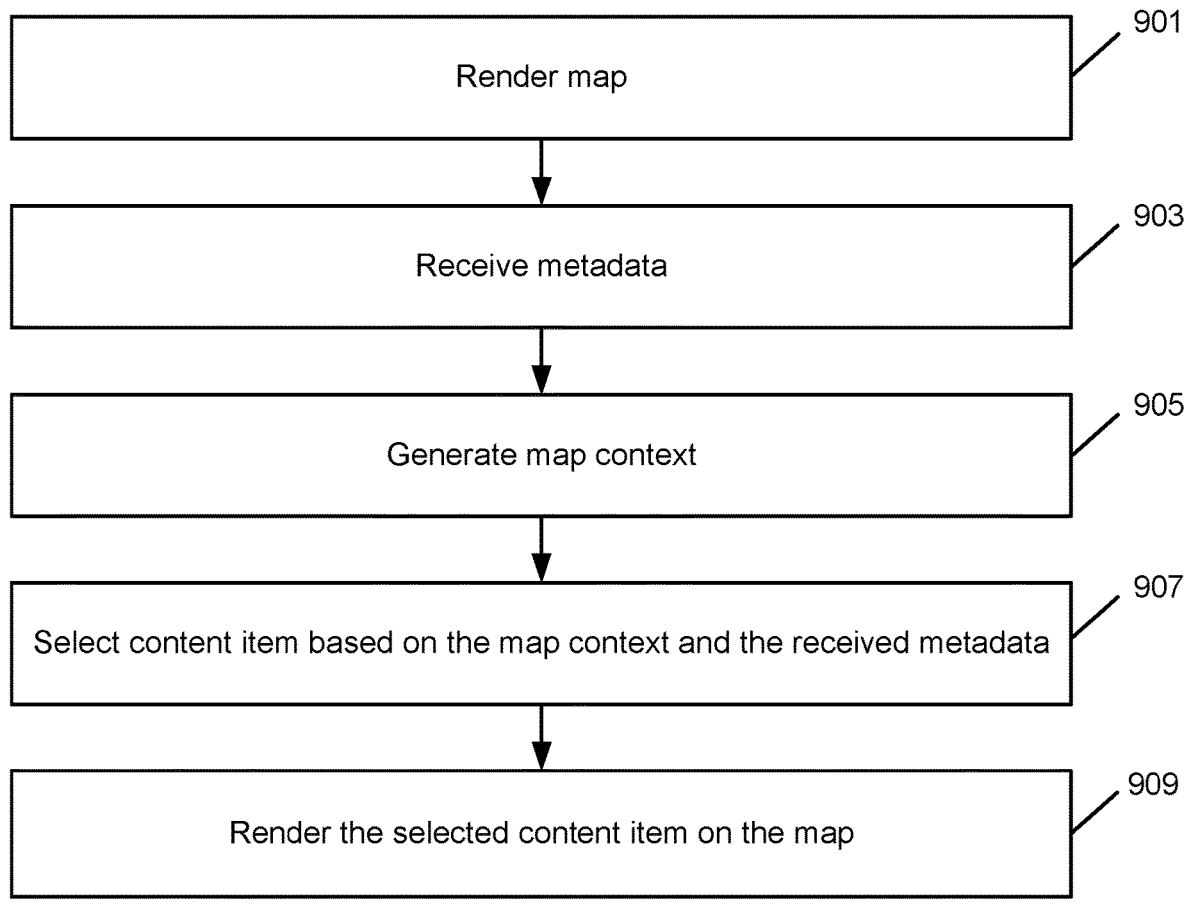
FIG. 9 is an operational flow of an implementation of a method for selecting content items to render by a map application based on content items previously presented by one or more background applications.

FIG. 9 is an operational flow of an implementation of a method 900 for selecting content items 175 to render by a map application based on content items 175 previously presented by one or more background applications 115. The method 900 may be implemented by the map engine 165 and/or the map client 113.

At 901, a map is rendered. The map 140 may be rendered or presented by the map client 113 and/or the map engine 165 on a display associated with a client device 110. The map 140 may include a plurality of locations including a current location of the client device 110 and a current route being followed by the client device 110 between an origin location and a destination location.

At 903, metadata is received. The metadata 211 may be received by the content item selector 210 of the map engine 165. The metadata 211 may have been provided by one or more background applications 115 executing on the client device 110. The metadata 211 may be associated with, or may identify, or more content items 175 that were presented by the background applications 115. The content items 175 may be advertisements that were presented to the user of the client device 110 at some time in the past when the background applications 115 were active. For example, one of the background applications 115 may be a videogame, and the metadata 211 may identify an advertisement that was displayed to the user while playing the videogame.

At 905, a map context is generated. The map context 167 may be generated by the context generator 205 of the map engine 165. The map context 167 may be for the map application executing in the foreground of the client device 110. The map context 167 may comprise information such as a current location of a user or of the client device 110, a current route being traveled by the user or of the client device 110, and any search terms or queries that the user may have provided to the map application. Other information may be included in the map context 167.

At 907, a content item is selected based on the map context and the selected metadata. The content item 175 may be selected by the content item selector 210 of the map engine 165. Depending on the implementation, the metadata 211 may be used to identify one or more content items 175 that are similar to, or that are related to, content items 175 that were previously presented by the background applications 115. Once these content items 175 are identified, the map context 167 may be used to select the identified content items 175 that are the most relevant to the map context 167.

For example, the metadata 211 may indicate that a content item 175 related to a local florist and a content item 175 related to a local baker were presented to the user by a background application 115. The content item selector 210 may identify content items 175 that are also related to the local baker and the local florist. The map context 167 may indicate the user is at a location that is close to the local baker, and that the user is interested in food. Accordingly, the content item selector 210 may select the content item 175 that is related to the local baker for presentation to the user.

At 909, the selected content item is rendered on the map. The selected content item 175 may be rendered or presented on the display associated with the client device 110 on top of the rendered map 140 by the map client 113 and/or the map engine 165. Continuing the example above, the content item 175 related to the local baker may be presented by rendering the content item 175 on the map 140 at the location associated with the local baker.

Figure 10:
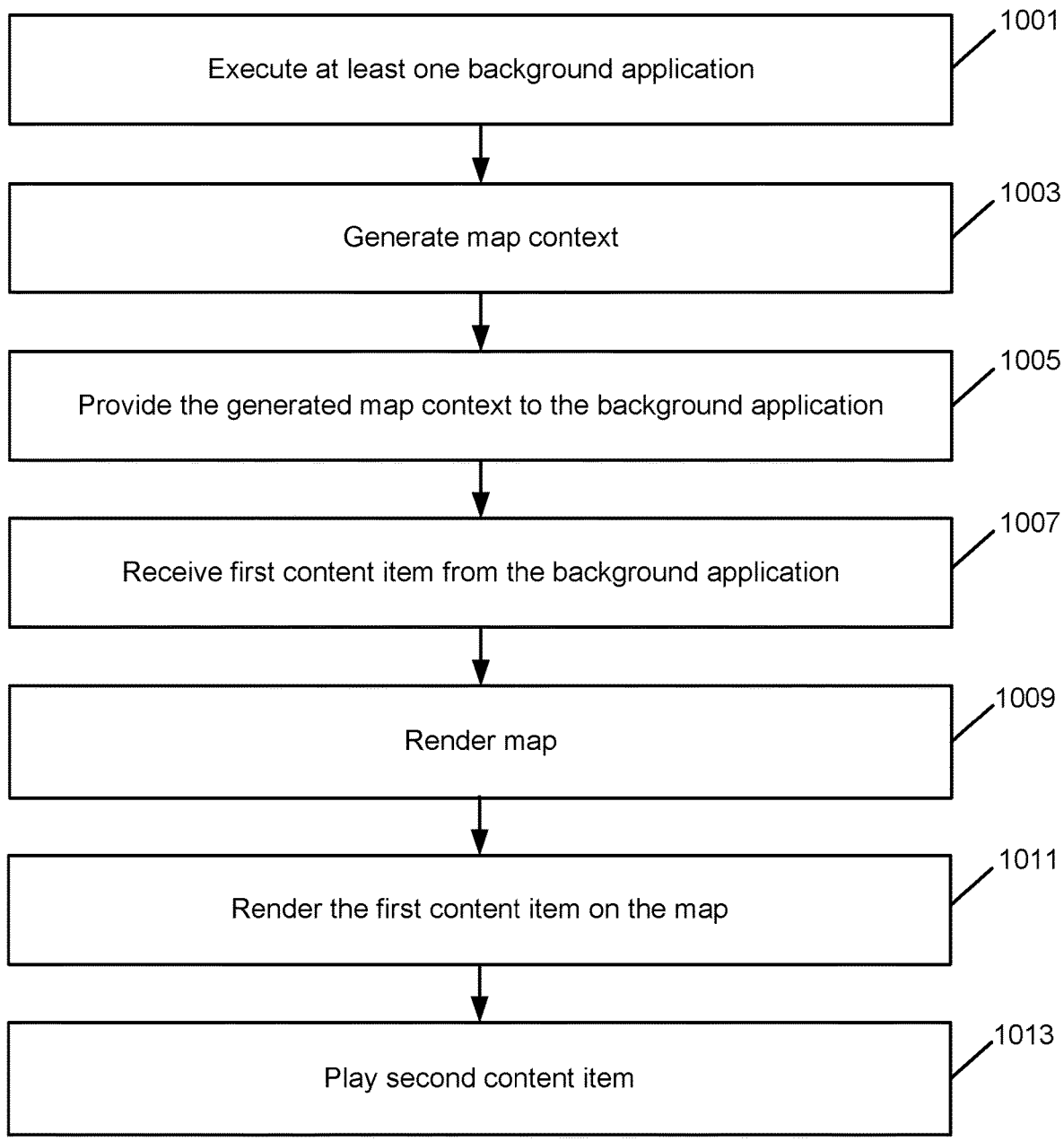
FIG. 10 is an operational flow of an implementation of a method for rendering a first content item provided by a background application while the background application plays a second content item.

FIG. 10 is an operational flow of an implementation of a method 1000 for rendering a first content item 175 provided by a background application 115 while the background application 115 plays a second content item 175. The method 1000 may be implemented by the map engine 165 and/or the map client 113.

At 1001, at least one background application is executed. The at least one background application 115 may be executed by a client device 110 such as a smartphone or a tablet computer. The at least one background application 115 may be a music streaming application 115, for example. The music streaming application 115 may play one or more audio content items 175 on a speaker connected to, or paired with, the client device 110. Other types of background applications 115 may be supported. The application 115 may be considered a background application 115 because it may not have control of the display or a user interface associated with the client device 110.

At 1003, a map context is generated. The map context 167 may be generated by the context generator 205 of the map engine 165. The map context 167 may be for a map application executing on the client device 110. The map application may be considered a foreground application because the map application may have control of the display and a user interface associated with the client device 110. For example, the user may be using the map application to navigate a route rendered on the display associated with the client device 110 by the map application.

At 1005, the generated map context is provided. The generated map context 167 may be provided to the background applications 115 executing on the client device 110 by the context generator 205 of the map engine 165.

At 1007, a first content item is received. The first content item 175 may be received by the map client 113 and/or the map engine 165 from the background application 115. The background application 115 may have selected and provided the first content item 175 based on the map context 167. The first content item 175 may be associated with a location. For example, if the first content item 175 is an advertisement for a water park, then the location associated with the first content item 175 may be associated with the location of the advertised water park.

At 1009, a map is rendered. The map 140 may be rendered or presented by the map client 113 and/or the map engine 165 on a display associated with a client device 110. The map 140 may include a plurality of locations including a current location of the client device 110 and a current route being followed by the client device 110.

At 1011, the received first content item 175 is rendered on the map. The received first content item 175 may be rendered or presented on the display associated with the client device on top of the rendered map 140 by the map client 113 and/or the map engine 165. The content item 175 may be rendered on the map 140 at the associated location.

At 1013, a second content item is played. The second content item 175 may be played or provided by the background application 115. The background application 115 may be a music streaming applications 115 and the second content item 175 may be an audio advertisement. The second content item 175 may be related to the first content item 175. Continuing the example above, the second content item 175 and the first content item 175 may be for the same water park.

The second content item 175 may be played by the background application 115 at approximately the same time that the first content item 175 is rendered or displayed. As may appreciated, the second content item 175 and the first content item 175 may reinforce each other's message and therefore increase the likelihood that the first content item 175 is selected by the user.

FIG. 11 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by the device 1100 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communication connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for selecting content items based on map contexts by background applications and for rendering the selected content items on a map is provided. The system includes at least one computing device, and a map engine executed on the at least one computing device. The map engine is adapted to: generate a map context, wherein the map context comprises a current location of the at least one computing device; provide the generated map context to one or more of a plurality of applications; in response to the provided map context, receive one or more content items from one or more applications of the plurality of applications, wherein each content item is associated with a location and each content item was selected by an application of the plurality of applications based on the map context; render a map on a display associated with the at least one computing device; and render the received one or more content items on the rendered map based on the locations associated with the received one or more content items and the location of the at least one computing device.

Implementations may include some or all of the following features. The map context may include a route associated with the at least one computing device. The map context may include a location and map history associated with the at least one computing device. The plurality of applications may be installed on the at least one computing device, and the map context may further include indicators of one or more applications of the plurality of applications. At least one application of the plurality of applications may plays an audio content item on the at least one computing device at approximately a same time that the received one or more content items are rendered on the map. The map engine may be further adapted to: receive a selection of one of the rendered one or more content items; in response to the selection, generate a route from the current location of the at least one computing device and the location associated with the selected one of the rendered one or more content items; and render the generated route on the map. The at least one computing device may include one or more of a smartphone, a tablet, or a vehicle navigation system. The plurality of applications may be background applications executing on the at least one computing device.

In an implementation, a system for selecting content items to render on a computing device using a map context and metadata generated by a plurality of background applications is provided. The system includes at least one computing device, and a map engine executed on the at least one computing device. The map engine is adapted to: render a map on a display associated with the at least one computing device; receive metadata generated by a plurality of applications, wherein the metadata is associated with one or more content items presented by the applications of the plurality of applications; generate a map context, wherein the map context comprises a current location of the at least on computing device; select a content item based on the map context and the received metadata, wherein the content item is associated with a location; and render the selected content item on the rendered map based on the location associated with the content item and the location of the at least one computing device.

Implementations may include some or all of the following features. The map context may further include a query received from a user associated with the at least one computing device. The presented one or more content items may have been presented by the applications of the plurality of applications before the map was rendered on the display. The plurality of applications may be background applications executing on the at least one computing device. The map engine may be further adapted to: receive a selection of the rendered content item; in response to the selection, generate a route from the location of the at least one computing device and the location associated with the rendered content item; and render the generated route on the map. The at least one computing device comprises one or more of a smartphone, a tablet, or a vehicle navigation system. At least one application of the plurality of applications may play an audio content item on the at least one computing device at approximately a same time that the selected content item is rendered on the map.

In an implementation, a method for selecting content items based on map contexts by background applications is provided. The method may include: executing a background application by a computing device; generating a map context by the computing device, wherein the map context comprises a current location of the computing device; providing the generated map context to the background application by the computing device; in response to the generated map context, receiving a first content item from the background application, wherein the first content item is associated with a location and the first content item was selected by the background application based on the map context; rendering a map on a display associated with the computing device by the computing device; and rendering the received first content item on the rendered map based on the location associated with the first content item and the location of the computing device.

Implementations may include some or all of the following features. The method may further include: receiving a selection of the rendered first content item; in response to the selection, generating a route from the current location of the computing device to the location associated with the rendered first content item; and rendering the generated route on the map. The background application may play a second content item at the computing device at approximately a same time that the first content item is rendered on the map. The map context may further include a query received from a user associated with the computing device. The computing device may include one or more of a smartphone, a tablet, or a vehicle navigation system.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for selecting content items based on map contexts by background applications and for rendering the selected content items on a map, the system comprising:
   a computing device; and
   a map engine executed on the computing device and adapted to:
      generate a map context, wherein the map context comprises a current location of the at least one computing device;
      provide the generated map context to each of a plurality of background applications executing on the computing device;
      in response to the provided map context, receive one or more content items from the plurality of background applications that are executing on the computing device, wherein each content item is associated with a location and each content item was selected by the respective background application of the plurality of background applications based on the map context;
      render a map on a display associated with the at least one computing device; and
      render at least one of the received one or more selected content items on the rendered map based on the locations associated with the received one or more selected content items and the location of the at least one computing device.

2. The system of claim 1, wherein the map context further comprises a route associated with the at least one computing device.

3. The system of claim 1, wherein the map context further comprises a location and map history associated with the at least one computing device.

4. The system of claim 1, wherein the plurality of background applications is installed on the at least one computing device, and the map context further comprises at least one indicator of one or more background applications of the plurality of background applications currently executing on the at least one computing device.

5. The system of claim 1, wherein at least one background application of the plurality of background applications plays an audio content item on the at least one computing device at approximately a same time that the received one or more content items are rendered on the map.

6. The system of claim 1, wherein the map engine is further adapted to:
   receive a selection of one of the rendered one or more content items;
   in response to the selection, generate a route from the current location of the at least one computing device and the location associated with the selected one of the rendered one or more content items; and
   render the generated route on the map.

7. The system of claim 1, wherein the at least one computing device comprises one or more of a smartphone, a tablet, or a vehicle navigation system.

8. The system of claim 1, wherein the one or more background applications remain background applications during the rendering operation of the received one or more selected content items on the rendered map.

9. A method for selecting content items based on map contexts by background applications comprising:
   executing a plurality of background applications by a computing device;
   generating a map context by the computing device, wherein the map context comprises a current location of the computing device;
   providing the generated map context to the plurality of background applications by the computing device;
   in response to the generated map context, receiving at least a first content item from each of the plurality of background applications, wherein the first content item is associated with a location and the first content item was selected by the respective background application based on the map context;
   rendering a map on a display associated with the computing device by the computing device; and
   rendering at least one of the received first content items on the rendered map based on the location associated with the first content item and the location of the computing device.

10. The method of claim 9, further comprising:
    receiving a selection of the rendered first content item;
    in response to the selection, generating a route from the current location of the computing device to the location associated with the rendered first content item; and
    rendering the generated route on the map.

11. The method of claim 9, wherein the background application plays a second content item at the computing device at approximately a same time that the first content item is rendered on the map.

12. The method of claim 9, wherein the map context further comprises a query received from a user associated with the computing device.

13. The method of claim 9, wherein the computing device comprises one or more of a smartphone, a tablet, or a vehicle navigation system.

14. The method of claim 9, wherein the one or more background applications remain background applications during the rendering operation of the received first content item on the rendered map.

* * * * *